Figure 1:
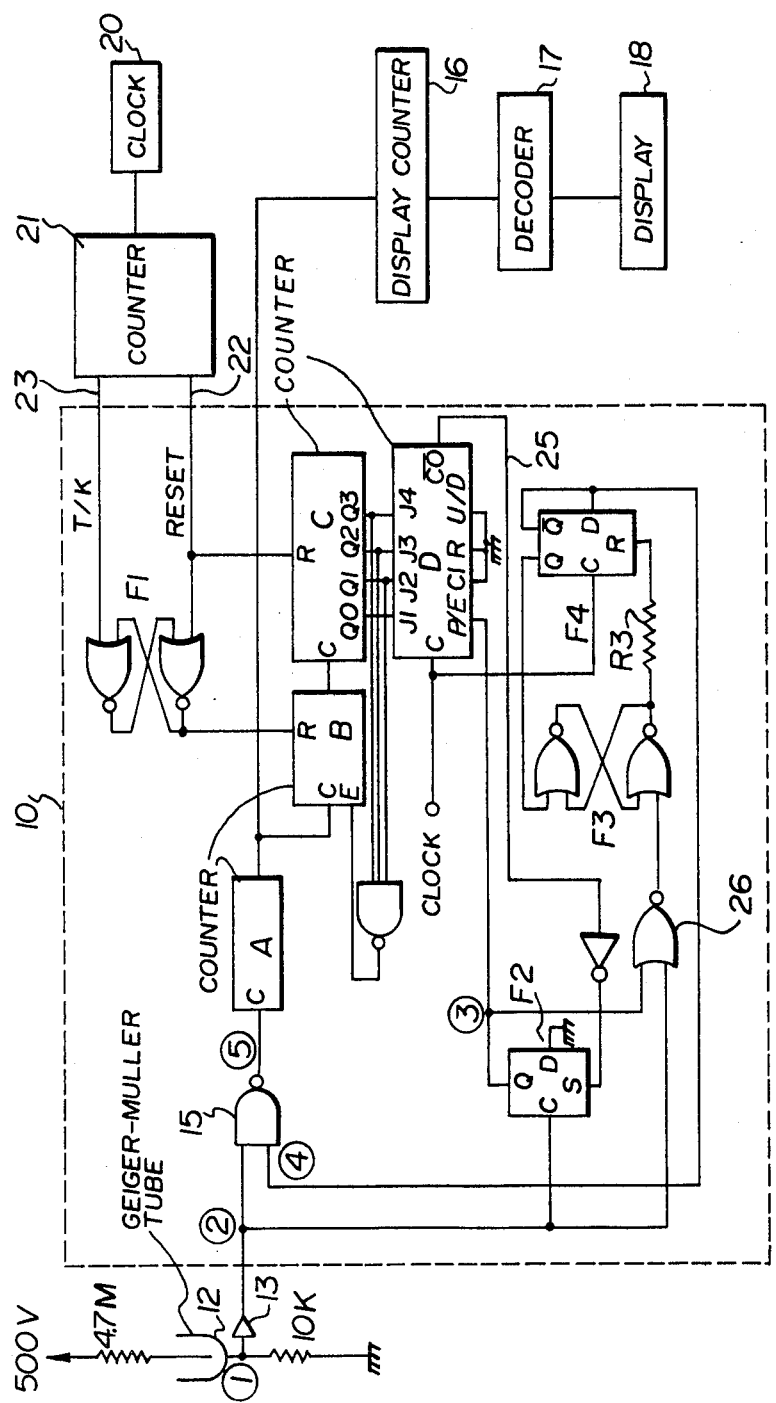

United States Patent [19]

East

[11] 4,419,579
[45] Dec. 6, 1983

[54] DEAD TIME COMPENSATION CIRCUIT

[75] Inventor: Philip C. East, Nepean, Canada

[73] Assignee: Her Majesty the Queen in right of Canada, Ottawa, Canada

[21] Appl. No.: 237,254

[22] Filed: Feb. 23, 1981

[30] Foreign Application Priority Data

Mar. 6, 1980 [CA] Canada .................................. 347112

[51] Int. Cl.³ ............................................ H01J 47/08
[52] U.S. Cl. .................................... 250/374; 250/388
[58] Field of Search ..................... 250/336.1, 374, 388; 307/220 R; 315/84.5

[56] References Cited

U.S. PATENT DOCUMENTS 3,814,937 6/1974 Lowes .................................. 250/374

Primary Examiner—Alfred E. Smith
Assistant Examiner—Carolyn E. Fields
Attorney, Agent, or Firm—Stevens, Davis, Miller & Mosher

[57] ABSTRACT

This invention relates to a dead time compensation circuit for a radiation detector using a Geiger-Muller tube. The Geiger-Muller tube is the most commonly used detector for measuring gamma radiation. However, they have a restricted linear range which makes it difficult to use them with digital numeric displays. The highest dose rate that can be measured is limited by the tube dead time, i.e. the interval after the initiation of a pulse during which a subsequent ionizing event does not produce a pulse. The present invention adds one or more pulses to the display counter when the Geiger-Muller tube provides two or more pulses in a given time interval (t). The dose rate or count rate is sampled at the beginning of each counting period (T) and the interval t is made proportional to the count rate. At low count rates, where dead time losses are negligible, no pulses are added. At high count rates, where t can be several times the tube dead time, counting losses of 50% can be compensated.

6 Claims, 2 Drawing Figures

DEAD TIME COMPENSATION CIRCUIT

This invention relates to a dead time compensation circuit for a radiation detector using a Geiger-Muller tube.

The Geiger-Muller (G-M) tube is the most commonly used detector for measuring gamma radiation. With advances in digital electronics, it is desirable to use digital numeric displays for radiacmeters and increase the use of G-M tubes. However, digital counting circuits require a linear response and a major limitation of G-M tubes is the restricted linear range, typically less than two decades. The lowest dose rate that can be measured is limited by the minimum number of counts required, in a specific counting period, to provide reasonable statistics. The higher dose rate that can be measured is limited by the tube dead time. The dead time is the time interval after the initiation of a pulse during which a subsequent ionizing event does not produce a pulse.

There are a number of analog circuits, used to drive a moving coil meter, that can provide a simple correction and, for a log scale, the meter scale can be drawn to match the scale log. For several linear decades, operating the tube in the pulsed mode provides the best answer. However, operating in the pulsed mode requires switching the high voltage (500 volts) to the G-M tube and this is not compatible with digital integrated circuits.

The present invention provides a circuit which adds a pulse or pulses to the display counter when the G-M tube provides two or more pulses in a given time interval (t). In this circuit, the dose rate or count rate is sampled at the beginning of each counting period (T) and the interval t is made proportional to the count rate. At low count rates, where dead time losses are negligible, no pulses are added. At high count rates, where t can be several times the tube dead time, counting losses of 50% can be compensated.

Thus, in accordance with the invention, there is provided a dead time compensation circuit for a radiation detector using a Geiger-Muller tube comprising a first counter for producing a count proportional to pulses produced by the Geiger-Muller tube during a time interval T, said first counter having an output adapted to feed a digital display counter, second counter means for storing a count proportional to pulses produced by the Geiger-Muller tube during a predetermined time interval T/K where K is a constant, means for decrementing to zero the count in said second counter means following expiration of said second time interval T/K, and means enabled while the count in said counter is being decremented to produce an extra pulse following receipt of a pulse from the Geiger-Muller tube which extra pulse is added to the count in said first counter.

Figure 2:
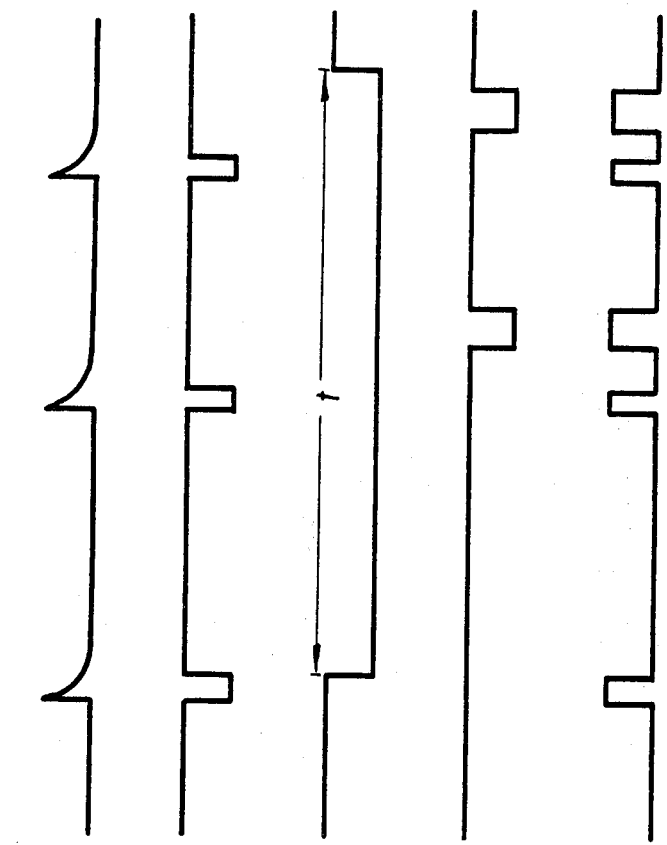

The invention will now be further described in conjunction with the accompanying drawings, in which:

FIG. 1 is a block diagram of a dead time compensation circuit in accordance with the invention, as well as some associated items of the radiation detector, and FIG. 2 comprises typical wave forms existing at locations ①...⑤ of the FIG. 1 block diagram for dose rates where compensation is provided. At dose rates near full scale and above time (t) will be equal to 14 clock pulses.

In the following description the input/output terminals of the various individual conventional electronic devices shown in FIG. 1 are described and illustrated using conventional device nomenclature. For example, a (C) terminal for a counter or flip flop represents its counting or clock input terminal, (R) and (S) represent reset and set terminals, (E) represents an enable input terminal, (D) represents the D input of a flip flop, and Q and $\overline{Q}$ represent flip flop outputs. For the described D counter, $\overline{CO}$ represents a carry out terminal, U/D represents an up/down terminal, C1 represents a carry in terminal, and PE represents a preset enable terminal.

Referring to FIG. 1, the dead time compensation circuit is indicated by dash line 10. Some other parts of the radiation detector circuitry are shown in simplified form.

The Geiger-Muller tube is indicated at 12 and it produces pulses at (1) (FIG. 2) which are amplified by amplifier 13 and fed to one input of NAND gate 15. The output pulses (5) (FIG. 2) from NAND gate 15 are applied as a counting input (C) to counter A. The counter A has an output connected to a display counter 16, the output of which feeds a decoder 17 which, in turn, drives a display 18, such as a liquid crystal display or other digital type of display.

A clock 20, forming part of the radiation detector, feeds a counter 21 which produces reset pulses at intervals T on the line 22 marked RESET. At a time T/K from the beginning of each counting period, the counter 21 also produces a pulse T/K on line 23 which sets the flip-flop F1. For the first part T/K of each counting period, until flip-flop F1 is clocked by the pulse on line 23, the pulses from counter A are also fed to the counting input (C) of counter C via counter B. This period (T/K) should be short but permit at least 200 G-M tube pulses at the full scale count rate. Counter B divides the pulses applied to its counting input (C) and produces a smaller count at its output, up to 14 pulses, which are fed to counter C during this period. Counter B is disabled by a Nand gate when there are 14 pulses stored in Counter C.

The amplified G-M tube pulses (2) (FIG. 2) also clock the clock input (C) to flip-flip F2. With F2 clocked, counter D counts down from the number of pulses in counter C, the parallel outputs Q0, Q1, Q2, Q3, of which feed parallel inputs J1, J2, J3, J4 of counter D. When counter D reaches O, it produces an output $\overline{CO}$ on line 25 that sets flip-flop F2 by the set terminal S. The Q output of flip-flop F2, termed a preset enable (3) (FIG.2) is low for a time which is equal to the clock period times the number of counts in the counter C (and D). The clock period may suitably be about half the G-M tube dead time.

Pulses (2) (FIG. 2) from the G-M tube which occur while the preset enable (3) (FIG. 2) is low will be applied through NOR gate 26 to reset flip-flop F3 which, in turn, enables flip-flop F4 via the resistor R3 and reset terminal R so that, upon the occurence of the next clock pulse, it will provide an additional pulse (4) (FIG. 2) from its output ($\overline{Q}$). This additional pulse is applied through NAND gate 15 to the counter A and, in turn, the display counter 16, decoder 17 and display 18.

If an 18506 G-M tube is used, a dose rate of 0.1 to 100 mR/h may be measured. The 18506 has a nominal count rate of 55 c/s at 1 mR/h so that by dividing by 8 in counter A and counting for about 1.5 seconds, there will be 10 counts in the display counter 16. At the end of the counting period a load pulse, not shown, will transfer the count in display counter 16 to latches in the decoder 17 and the reading 1.0 will be displayed on display 18. All counters are then reset and the cycle repeats.

The clock 20 may have a period of approximately 120 μs. The output 22 of counter 21 may suitably be arranged to go high after 12,288 clock pulses. At this time, a load pulse may be provided, followed immediately by a reset pulse.

The output 23 may be arranged to go high after 1280 clock pulses (T/K), which, in this case, means that K is approximately 10.

At low dose rates there will be only one or two counts in counter C so that the output Q of flip-flop F2 will be low for a time comparable to the G-M tube dead time, and no additional pulses will be generated. At high dose rates there will be 14 counts in counter C so that the output Q of flip-flop F2 will be low for a time greater than 8 times the tube dead time, allowing up to 8 additional pulses to be generated.

The embodiments of the invention in which an exclusive property or privilege is claimed are defined as follows:

1. A dead time compensation circuit for a radiation detector using a Geiger-Muller tube comprising a first counter for producing a count proportional to pulses produced by the Geiger-Muller tube during a predetermined time interval T, said first counter having an output for feeding a digital display counter, second counter means for storing a count proportional to pulses produced by the Geiger-Muller tube during a predetermined time interval T/K where K is a constant, means for decrementing to zero the count in said second counter means following expiration of said time interval T/K, and means enabled while the count in said second counter is being decremented to produce an extra pulse following receipt of a pulse from the Geiger-Muller tube which extra pulse is added to the count in said first counter.

2. A circuit as claimed in claim 1 wherein said first counter is a dividing counter which produces an output which is a predetermined fraction of the number of pulses received from the Geiger-Muller tube.

3. A circuit as claimed in claim 2 wherein said second counter means includes a second dividing counter having an input connected to the output of said first counter and an output connected to feed a serial input of a third counter, said third counter having parallel outputs feeding parallel inputs of a fourth counter.

4. A circuit as claimed in claim 3 including a first flip-flop which is set by pulses from circuitry in the radiation detector at intervals T/K and reset at intervals T, said first flip-flop disabling, when set, said second dividing counter.

5. A circuit as claimed in claim 4 wherein a second flip-flop is clocked by pulses from the Geiger-Muller tube to provide a preset enable signal to said fourth counter, said second flip-flop being set by said fourth counter when its count is decremented to zero.

6. A circuit as claimed in claim 5 wherein said preset enable signal also enables one input of a NOR gate, said NOR gate having a second input connected to receive pulses from the Geiger-Muller tube and an output connected to reset a third flip-flop, said third flip-flop, when reset, enabling a fourth flip-flop to be clocked to provide an extra pulse to said first counter.

* * * * *